(12) United States Patent
Langer et al.

(10) Patent No.: US 8,262,490 B2
(45) Date of Patent: Sep. 11, 2012

(54) CONNECTING SYSTEM AND CONSTANT VELOCITY JOINT

(75) Inventors: Gerald Langer, Buelstringen (DE); Claus Disser, Seligenstadt (DE); Volker Szentmihalyi, Gutach (DE)

(73) Assignee: Shaft-Form-Engineering GmbH, Hausach (DE)

( * ) Notice: Subject to any disclaimer, the term of this patent is extended or adjusted under 35 U.S.C. 154(b) by 0 days.

(21) Appl. No.: 13/272,764

(22) Filed: Oct. 13, 2011

(65) Prior Publication Data
US 2012/0058832 A1 Mar. 8, 2012

Related U.S. Application Data

(63) Continuation of application No. PCT/DE2010/000355, filed on Mar. 25, 2010.

(30) Foreign Application Priority Data

Apr. 14, 2009 (DE) .......................... 10 2009 017 007

(51) Int. Cl.
*F16D 1/116* (2006.01)

(52) U.S. Cl. ...................... 464/182; 464/906; 403/359.5

(58) Field of Classification Search .................. 464/182, 464/905, 906; 403/359.1, 359.5, DIG. 7
See application file for complete search history.

(56) References Cited

U.S. PATENT DOCUMENTS

| 3,017,756 | A | * | 1/1962 | Sharp | 464/906 |
| 3,447,341 | A | * | 6/1969 | Miller, Jr. | 464/906 |
| 5,607,358 | A | * | 3/1997 | Stall et al. | 464/182 X |
| 6,152,825 | A | | 11/2000 | Doell | |
| 7,806,773 | B2 | | 10/2010 | Disser | |
| 2007/0032303 | A1 | | 2/2007 | Disser et al. | |
| 2008/0161119 | A1 | * | 7/2008 | Nishio | |
| 2010/0143075 | A1 | * | 6/2010 | Disser | |

FOREIGN PATENT DOCUMENTS

| DE | 197 39 934 A1 | | 4/1998 | |
| DE | 197 44 870 A1 | | 4/1999 | |
| DE | 103 42 497 A1 | | 4/2005 | |
| DE | 10 2006 006 980 A1 | | 9/2006 | |
| GB | 1 447 078 | * | 8/1976 | 464/146 |
| WO | WO 2009/012767 A2 | | 1/2009 | |

OTHER PUBLICATIONS

Corresponding International Search Report with English Translation dated Jul. 23, 2010 (four (4) pages).

\* cited by examiner

*Primary Examiner* — Gregory Binda
(74) *Attorney, Agent, or Firm* — Crowell & Moring LLP

(57) ABSTRACT

A system for connecting a shaft (5) to a joint (1), which system includes a shaft journal (10) that is connected to the shaft (5), and a sleeve (4) that is connected to a hub of the joint (1), the sleeve (4) having a shaft-side first opening section (7), a joint-side second opening section (8), and a first radial stop section (14), and the shaft journal (10) having a shaft-side first shaft-journal section (11), a joint-side second shaft-journal section (12), and a second radial stop section (15) for delimiting the insertion path of the shaft journal (10) in the sleeve (4).

9 Claims, 2 Drawing Sheets

CONNECTING SYSTEM AND CONSTANT VELOCITY JOINT

CROSS REFERENCE TO RELATED APPLICATIONS

This application is a continuation of international patent application No. PCT/DE2010/000355, filed Mar. 25, 2010, designating the Unites States of America and published in German on Oct. 21, 2010 as WO 2010/118725 A1, the entire disclosure of which is incorporated herein by reference. Priority is claimed based on Federal Republic of Germany patent application no. DE 10 2009 017 007.3, filed Apr. 14, 2009, the entire disclosure of which is likewise incorporated herein by reference.

BACKGROUND OF THE INVENTION

The invention relates to a system for connecting a shaft to a joint, which system comprises a shaft journal that is connected to the shaft and a sleeve that is connected to a hub of the joint. The sleeve comprises a central opening for receiving the shaft journal that is secured axially in the sleeve by a retaining ring.

Published German patent application no. DE 197 39 934 discloses a generic connection system in which a tubular shaft is connected by a shaft journal to the inner hub of a constant velocity joint so as be rotationally fixed. The shaft is secured against being pulled out of the hollow inner hub of the constant velocity joint by a retaining ring that is disposed in a peripheral groove on the shaft and that engages in a corresponding counter-groove in the inner hub. In this connection system, the shaft is secured against displacement relative to the inner hub solely by the retaining ring that supports the axial forces. In such a construction of the connection system, it is possible for an axial resistance defined by the retaining ring to be exceeded, for example, during the assembly operation in which the shaft is inserted together with the shaft journal into the hub, so that the retaining ring jumps out of the peripheral groove of the shaft, strikes the shaft through the inner hub, and penetrates the interior of the constant velocity joint. As a result, the torque-securing connection between the shaft and the inner hub can likewise be overridden.

U.S. Pat. No. 7,806,773 (=DE 10 2006 006 980) describes a hollow inner hub that is sealed on the joint side by a cover. When the shaft journal in this joint is secured only by a retaining ring, there is a risk that the shaft journal can no longer be held by the retaining ring in the case of extremely high insertion forces and the shaft journal may impact against the cover due to the high applied force and push the cover out of its mounting, thereby causing a possible leakage of lubricant and/or entry of dirt particles.

Published US patent application no. US 2007/032303 (=DE 103 42 497) describes a connection system in which a drive shaft can be inserted into a joint connection, the inner hub that serves as the joint connection comprising a central recess that is provided with a profiling for torque transmission. An appropriately corresponding profiling is provided on the shaft journal that is inserted into the central recess until a flange provided in the form of an end stop at the transition between the shaft journal and the shaft so as to extend outwardly in the radial direction abuts against the outer end face of the inner hub, as a result of which a further axial penetration of the shaft in the direction of the joint is prevented. The shaft is secured in the inner hub by a retaining ring that is disposed on the outer side of the inner hub or by a lock nut that is fitted over the flange and the thread of which engages in a thread provided on the outer side of the inner hub. As a result of the external flange extending from the shaft outwardly in the radial direction, such a solution for the connection system necessitates a large amount of space and, at the same time, increased weight and material, which conflicts with the general requirement of reducing weight, costs, fuel consumption, and $CO_2$ emission.

Furthermore, the shaft must first be inserted into the joint connection, and then a suitable means for axially securing the shaft must be applied, as a result of which the assembly effort increases and an automatic assembly proves to be more difficult.

SUMMARY OF THE INVENTION

It is therefore an object of the present invention to provide an improved system for connecting a shaft to a joint.

Another object of the invention is to provide a system for connecting a shaft to a joint, which system firstly protects the shaft from being pressed past its intended position during the assembly operation or during operation and which ensures a secure positioning of the retaining ring.

A further object of the invention is to provide a system for connecting a shaft to a joint which system also simultaneously exhibits improvements in terms of its weight, installation space and ease of assembly.

According to the invention, these and other objects of the invention are achieved substantially in that the sleeve comprises a central opening comprising a shaft-side first opening section, the internal diameter of which is larger than that of a joint-side second opening section disposed in the direction of insertion, a first radial stop section being provided between the first opening section and the second opening section. This first radial stop section extends at least substantially at right angles to the longitudinal axis of the sleeve. Similarly, the shaft journal comprises a shaft-side first shaft-journal section, the external diameter of which is larger than that of a joint-side second shaft-journal section, a second radial stop section being provided between the first shaft-journal section and the second shaft-journal section in the form of a counter-stop for delimiting the insertion path of the shaft journal in the sleeve. Likewise, this second radial stop section extends at least substantially at right angles to the longitudinal axis of the shaft journal. When, for example, the shaft journal, which may be formed integrally with the shaft, is inserted into the opening of the sleeve, the shaft journal and the sleeve are secured against axial relative movements by the retaining ring that engages in a peripheral groove on the shaft journal and simultaneously in an inner groove on the inner surface of the sleeve. In the case of excessively high axial loads, such as those that can occur, for example, during an incorrectly carried out assembly operation, this axial retainer is not overpressed since the second stop section of the shaft journal abuts against the first stop section of the opening section. Thus the insertion path of the shaft journal in the sleeve is always delimited by the stop sections, and the shaft journal cannot penetrate the interior of the joint. In this way, it is always ensured that the retaining ring is in its correct position. Moreover, the assembly can be carried out in a single operation since the shaft journal need only be inserted into the opening and secured axially by automatically locking the retaining ring. The stop ensures the correct orientation of the peripheral groove of the shaft journal relative to the inner groove of the sleeve and the engagement of the retaining ring in the grooves. As compared to connection systems known in the prior art, the arrangement of the securing mechanism in the opening of the sleeve provides the option of realizing a space-saving and light-weight solution.

Preferably, the first radial stop section and the second radial (counter)-stop section extend at right angles to the longitudinal axis of the sleeve. But it is also possible for the radial sections to extend at an angle that deviates marginally from 90° relative to the longitudinal axis of the sleeve.

It has proven to be advantageous if the shaft journal comprises a sealing ring that is configured to seal the sleeve. During regular operation, the drive train of a motor vehicle is exposed to harmful environmental effects such as salt, water, sand etc. which can impair the operability of a joint in that, for example, the lubricating grease becomes contaminated and results in increased friction. The sealing ring seals the constant velocity joint from such types of harmful elements so that these harmful substances cannot enter the interior of the joint, more particularly, the region of the splines. This also serves to protect the splines from dirt and corrosion during assembly and disassembly. Advantageously, this sealing ring is disposed on the shaft-side upstream of the retaining ring. In principle, however, it is also possible to arrange the sealing ring on the joint-side second shaft-journal section, as a result of which the interior of the joint continues to be protected from environmental effects.

Preferably, the retaining ring is also disposed on the shaft-side first shaft-journal section. In one embodiment of the invention, it is also possible for the retaining ring to be disposed on the joint side upstream of the second stop section on the joint-side second shaft-journal section. The stops further ensure the protection of the joint from being over-pressed.

Preferably, an opening section of the sleeve and a shaft-journal section are configured such that torque can be transmitted between the two sections. For example, in order to ensure a reliable force transmission from the shaft to the joint in the case of a constant velocity joint, a corresponding profiling for torque transmission can be provided on the outer surface of the shaft journal and the inner surface of the opening, which profiling may, for example, be in the form of teeth. These teeth can be disposed in the first shaft-journal section and in the first opening section.

In a refinement development of the concept of the invention, it is also possible for the torque transmission to take place between the joint-side second shaft-journal section and in the joint-side second opening section.

Particularly with a view to reducing parts and saving weight, provision is made in an additional embodiment of the invention for a sleeve that is formed integrally with the inner hub. Furthermore, the joint opening can be closed by a cover on the side oriented away from the shaft, which reduces the requirement of lubricant in the interior of the joint. The second shaft-journal section is configured such that the shaft journal does not impact against the cover, as a result of which the lubricant supply system in the joint remains protected from harmful effects. More particularly, the second shaft journal is prevented from contacting the cover by delimiting the insertion path of the shaft journal in the sleeve by the corresponding stop sections.

The invention further relates to a constant velocity joint comprising an inner hub and an outer hub, and a connection system of the aforementioned type, it being possible for the sleeve to be formed integrally with the outer hub. Likewise, it is possible for the sleeve to be connected or formed integrally with a driver housing encompassing primarily the outer hub, which establishes a torque-securing connection between the driver housing or the outer hub and the shaft.

BRIEF DESCRIPTION OF THE DRAWINGS

Additional features, advantages, and possible applications of the present invention are disclosed in the following description of illustrative embodiments as depicted in the accompanying drawings. All the features described and/or represented in the figures are individually part of the subject-matter of the present invention irrespective of the manner in which they are combined in the claims or the dependencies of the claims. In the drawings:

DETAILED DESCRIPTION OF PREFERRED EMBODIMENTS

Figure 1:
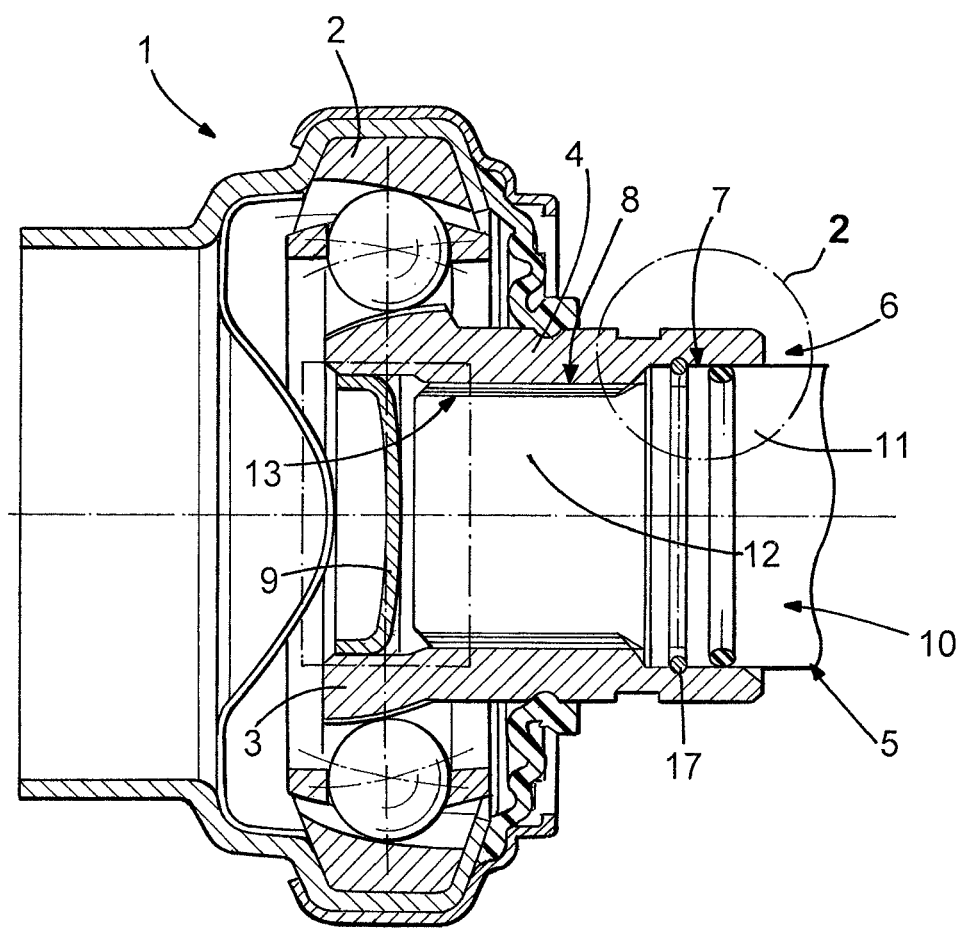
FIG. 1 is a cross-section view of a universal joint comprising a connection system according to the invention.

The constant velocity joint 1 shown in FIG. 1 comprises an outer hub 2 and an inner hub 3 that is formed integrally with a sleeve 4. The sleeve 4 is in turn configured to be connected to a drive shaft 5 or to a shaft to be driven. For this purpose, the sleeve 4 comprises an opening 6 comprising a shaft-side first opening section 7 and a joint-side second opening section 8. The interior of the constant velocity joint 1 is sealed from the opening 6 of the sleeve 4 by a cover 9 that is inserted into the sleeve 4.

On the joint side, the shaft 5 ends in a shaft journal 10 comprised of a shaft-side first shaft-journal section 11 and a joint-side second shaft-journal section 12. In FIG. 1, the shaft 5 together with the shaft journal 10 is shown as being disposed in the opening 6 of the sleeve 4 which corresponds to the state after assembly; i.e. the state in which the shaft journal 10 has been inserted into the opening 6 of the sleeve 4. As a result of this insertion, the shaft-side first shaft-journal section 11 is disposed in the region of the shaft-side first opening section 7, and the joint-side second shaft-journal section 12 is disposed in the region of the joint-side second opening section 8. The joint-side second shaft-journal section 12 and the joint-side second opening section 8 are each provided with corresponding (i.e., mating) teeth 13 that ensure a transmission of torque from the shaft 5 to the inner hub 3 of the joint 1.

Figure 2:
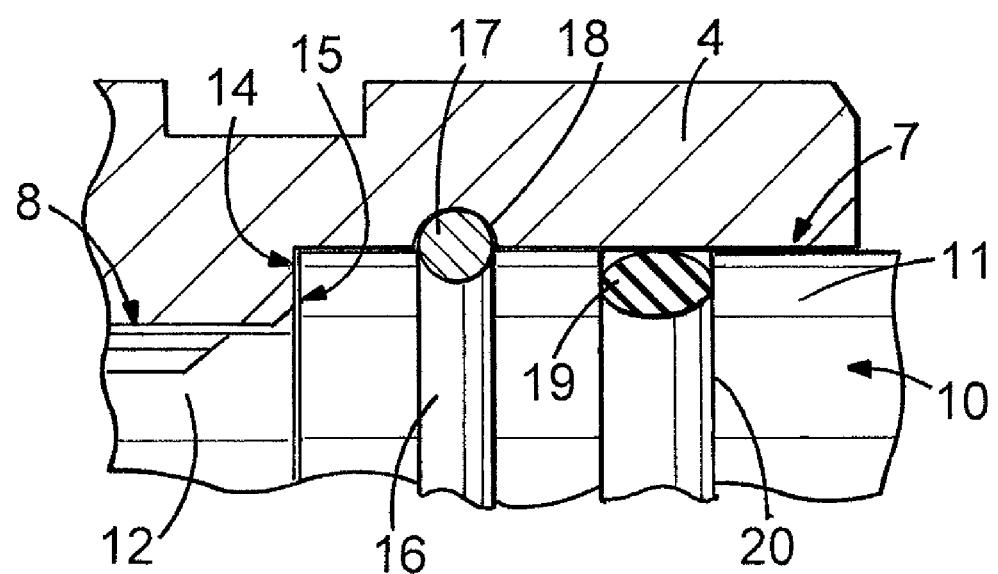
FIG. 2 is a detail view of the stop section shown in FIG. 1.

The detail view of FIG. 2 shows the manner in which the shaft journal 10 is secured in the sleeve 4 against relative displacement in the axial direction. The internal diameter of the shaft-side first opening section 7 is larger than the internal diameter of the joint-side second opening section 8. As a result of this feature of the invention, a first radial stop section 14 is formed that extends radially at right angles to the longitudinal axis of the sleeve. Similarly, the external diameter of the shaft-side first shaft-journal section 11 is larger than the external diameter of the joint-side second shaft-journal section 12. According to the invention, a second radial stop section 15 is formed here.

FIG. 2 further shows the cooperation between both the radial stops 14 and 15 and the functioning thereof. In the embodiment shown, the shaft journal 10 comprises a peripheral groove 16 that receives a retaining ring 17 that engages in an inner groove 18 disposed on the inner surface of the opening 6 of the sleeve 4 and thus secures the shaft journal 10 against axial movements relative to the sleeve 4. The insertion path of the shaft journal 10 in the sleeve 4 is delimited in that a further penetration of the shaft journal 10 in the axial direction is prevented by the first radial stop section 14 and the second radial stop section 15, the second radial stop section 15 bearing against the first radial stop section 14. In this way, the shaft journal 10 or the joint-side second shaft-journal section 12 cannot penetrate the joint-side second opening section 8 to such an extent that the cover 9 shown in FIG. 1 would be pressed out of the sleeve 4, as a result of which the lubricant of the joint 1 would enter the opening 6 of the sleeve 4.

A sealing ring 19 mounted in a sealing-ring groove 20 on the shaft journal 10 seals the sleeve 4 in such a way that no elements which could impair the functioning of the constant velocity joint 1, can enter the sleeve between the shaft journal 10 and the sleeve 4.

In the embodiment shown, the constant velocity joint 1 is a ball joint constructed in the form of a counter-track joint, i.e. a fixed joint. Likewise, the connection system of the invention can be used in slip joints that enable an axial relative movement between the inner hub 3 and the outer hub 2. It has proven particularly advantageous to use the connection system of the invention in the transition between a gear output or differential input and a propeller shaft. The connection system of the invention can also be used in side shafts.

Basically, the position of the stop sections 14, 15 is selected such that first the retaining ring 17 is placed during assembly, i.e. the retaining ring 17 engages in the corresponding groove, and only then do the stop sections 14, 15 come into contact with each other. In this way, the retaining ring 17 is prevented from failing to engaging or not properly engaging as intended in the groove. Secondly, the difference, i.e. the distance between the engagement of the retaining ring and the contact of the stop sections must not be so large that the retaining ring can disengage from the groove. These features jointly ensure very high ease of assembly even in the case of high forces so that an incorrect assembly is avoided.

In this regard, it is particularly advantageous if the stop sections 14, 15 are oriented radially, that is, at right angles to the longitudinal axis of the shaft journal 10. This results in a hard and defined stop that is determined solely by the position of the two stop sections. By contrast, in the case of obliquely extending stop sections, the tolerances in the position of the components and the angular deviation or misalignment could add up so that no defined catch mechanism for the retaining ring would be achieved.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A system for connecting a shaft to a joint, said system comprising:
   a shaft journal that can be connected to the shaft,
   a sleeve that is connected to a hub of the joint and that has a central opening for receiving the shaft journal), and
   a retaining ring for axially fixing the shaft journal in the opening;
   wherein:
   the opening comprises a shaft-side first opening section having an internal diameter which is larger than the internal diameter of a joint-side second opening section;
   a first radial stop section is provided between the first opening section and the second opening section;
   the shaft journal comprises a shaft-side first shaft-journal section having an external diameter which is larger than the external diameter of a joint-side second shaft-journal section, and
   a second radial stop section is provided between the first shaft-journal section and the second shaft-journal section for delimiting the insertion path of the shaft journal in the sleeve,
   said shaft journal comprising a sealing ring that is configured to seal said sleeve,
   said sealing ring being disposed in a sealing-ring groove on said shaft-side first shaft-journal section, and
   said retaining ring being disposed in a peripheral groove on said shaft-side first shaft-journal section.

2. The connection system according to claim 1, wherein the joint-side second opening section of the sleeve and the joint-side second shaft-journal section are configured such that torque can be transmitted between them.

3. The connection system according to claim 2, wherein the joint-side second opening section of the sleeve and the joint-side second shaft-journal section respectively comprise mating teeth.

4. The connection system according to claim 1, wherein said joint is a constant velocity joint comprising an inner hub and an outer hub, wherein the sleeve is formed integrally with the inner hub.

5. The connection system according to claim 4, wherein said constant velocity joint is a counter-track joint.

6. The connection system according to claim 4, wherein the opening of the sleeve is closed on the side oriented away from the shaft journal by a cover, and the length of the joint-side second shaft-journal section is configured such that the shaft journal does not contact the cover.

7. The connection system according to claim 6, wherein said cover is disposed inside of said inner hub of said joint.

8. The connection system according to claim 1, wherein said sealing ring is disposed on the shaft-side upstream of said retaining ring.

9. The connection system according to claim 1, wherein said sealing ring is located between said shaft journal and said sleeve.

* * * * *